United States Patent [19]
Quinn

[11] Patent Number: 5,259,727
[45] Date of Patent: Nov. 9, 1993

[54] STEAM TURBINE AND RETROFIT THEREFORE

[76] Inventor: Francis J. Quinn, 4440 S. Fletcher, Fernandina Beach, Fla. 32034

[21] Appl. No.: 792,231

[22] Filed: Nov. 14, 1991

[51] Int. Cl.$^5$ ............................................... F01D 9/04
[52] U.S. Cl. .......................... 415/190; 415/209.2; 415/209.3; 29/402.08; 29/889.22
[58] Field of Search ............. 415/185, 189, 190, 202, 415/208.2, 209.2, 209.3; 29/401.1, 402.08, 888.011, 888.42, 889.1, 889.22

[56] References Cited

U.S. PATENT DOCUMENTS

| | | | |
|---|---|---|---|
| 1,154,777 | 9/1915 | Kieser | 415/202 |
| 2,196,045 | 4/1940 | Warren et al. | 415/209.2 |
| 2,196,062 | 4/1940 | Doran | 415/209.2 |
| 3,498,727 | 3/1970 | Martin, Jr. et al. | 415/209.2 |
| 4,840,537 | 6/1984 | Silvestri, Jr. | 415/202 |

FOREIGN PATENT DOCUMENTS

| | | | |
|---|---|---|---|
| 0026713 | of 1910 | United Kingdom | 415/202 |
| 0020060 | of 1912 | United Kingdom | 415/202 |

Primary Examiner—Edward K. Look
Assistant Examiner—Christopher Verdier
Attorney, Agent, or Firm—Arthur G. Yeager

[57] ABSTRACT

A steam turbine with replaceable nozzle portions including a replacement ring element welded to the remaining portion of the original turbine, the replacement ring element having a groove seat with tapered spaced opposing walls to receive a plurality of vane portions releasably locked in the groove, stabilized and sealed to prevent steam leakage therearound.

20 Claims, 4 Drawing Sheets

STEAM FLOW →

← FIG 8 VIEW

← FIG 9 VIEW →

STEAM TURBINE AND RETROFIT THEREFORE

BACKGROUND OF THE INVENTION

Steam turbines are generally large, heavy steel machines containing a rotor having a plurality of blades against which high velocity steam is directed to cause the rotor to turn. Normally an electric generator is affixed to the shaft of the rotor so as to produce electricity. Frequently the steam passes serially through several sets of rotor blades, each set being a "stage" of the turbine designed to make most efficient use of the steam it receives. The steam generally enters the turbine to the first stage at a high pressure and temperature, and passes through successive stages at lower pressure and lower temperature as it passes each stage. These turbines are individually designed, and hand made. The parts that become worn over usage are the rotor, its blades and bearings, and the nozzle portions which direct the steam against the rotor blades. Erosion occurs at the nozzle area and at the rotor blades, with corresponding losses in efficiency until it is necessary to replace the eroded parts. Generally in the nozzle area there are vanes which direct the steam in a precisely predetermined direction which is deemed to be most efficient with respect to the blades of the rotor. Usually the vanes are of a teardrop or airfoil shape with a large rounded leading edge and a short thin trailing edge. These vanes individually, or as a segment of several adjacent vanes, are welded into the terminus of the steam passageway. Removal of eroded vanes and replacement by new vanes is a time-consuming and expensive operation, as is readily appreciated.

The prior art nozzle and diaphragm assembly construction, widely used throughout the industry, is made up from a series of individually assembled component parts into sub-assembly weld fabrications. These sub-assemblies are then welded together to produce a nozzle and/or diaphragm assembly. After each sub-assembly and main weld fabrication a stress relief is required. Each assembly must be subjected to a furnace stress relief for approximately eight hours at 1300° F. to 1400° F. Unfortunately, it is not possible or practical to determine the overall effects these stress reliefs have on the most critical part of the steam path assembly—"The Nozzle Partition" without destroying the part. It has been regularly observed during a unit inspection, after approximately three years of operation from the time of initial startup, that the nozzle partitions have suffered extensive fatigue failures. These results will vary from unit to unit without any boiler degradation. The problem is primarily due to a reduction in the mechanical properties and fatigue strength of the nozzle partitions. The reduced life expectancy results are directly attributed to and effected by the number of actual stress reliefs to which the nozzle partitions are subjected and the thermal transient control of the process. This is one of the major problems that is overcome by the present invention.

A general object of this invention is the provision of a turbine having readily replaceable vane portions including nozzle or diaphragm portions. A specific object of this invention is to provide a novel retrofit for steam turbine in which replaceable nozzle portions are provided. It is another object of the invention to provide a novel retrofit steam turbine that has nozzle or diaphragm portions that are not welded into the turbine housing. Still other objects will become apparent from the more detailed description which follows.

BRIEF SUMMARY OF THE INVENTION

This invention relates to a steam turbine having a stationary annular passageway for conducting steam to a rotor driven by that steam, the passageway terminating in an arcuate groove having an upstream wall generally perpendicular to the direction of steam flow and two spaced tapered opposing walls that converge in the direction of steam flow. A plurality of tapered vane portions are spacedly arranged in the groove, the vane portions having an upstream end wall portion and two tapered opposite side wall portions fitting snugly into the groove to direct the flow of steam in a predetermined direction toward the rotor. Releasable means located between the walls of the groove and the wall portions of the vane portions for locking each of the vane portions in the groove and sealing it against leakage of steam in any direction other than that toward the rotor.

This invention also relates to a process for retrofitting a steam turbine to make it have replaceable portions by
(1) cutting away from the stationary part of the original steam turbine housing the section containing the portions to be replaced;
(2) welding the original steam turbine housing to receive replacement portion having an annular tapered groove as a seat for receiving tapered vane portions;
(3) preparing a keyway in the groove and placing a key in that keyway;
(4) preparing vane portions with appropriate keyways to fit the key and inserting a plurality of such vane portions into the groove;
(5) inserting seals to prevent steam leakage around the inserted vane portions; and
(6) placing a cover plate at the horizontal joint over exposed areas of the vane portions and seal grooves.

In specific embodiments the invention is applicable generally to any vane portions of turbine housing and to all stationary nozzles, diaphragms and reversing blade row applications.

BRIEF DESCRIPTION OF THE DRAWINGS

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

Prior Art Nozzle

Figure 1:
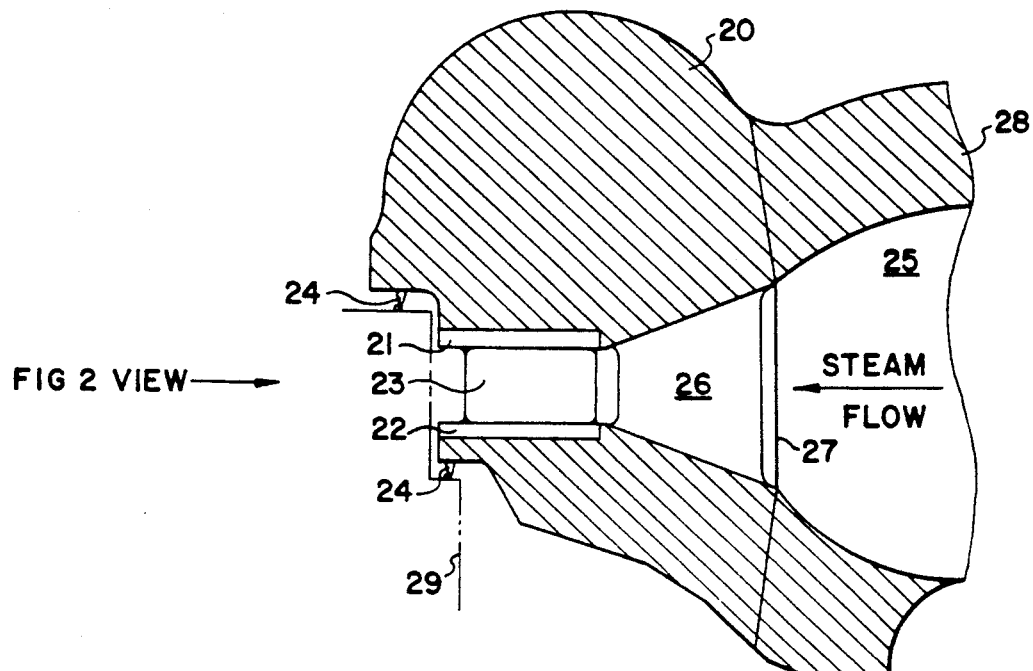
FIG. 1 is a cross sectional view of the nozzle portion of a prior art steam turbine.
Figure 2:
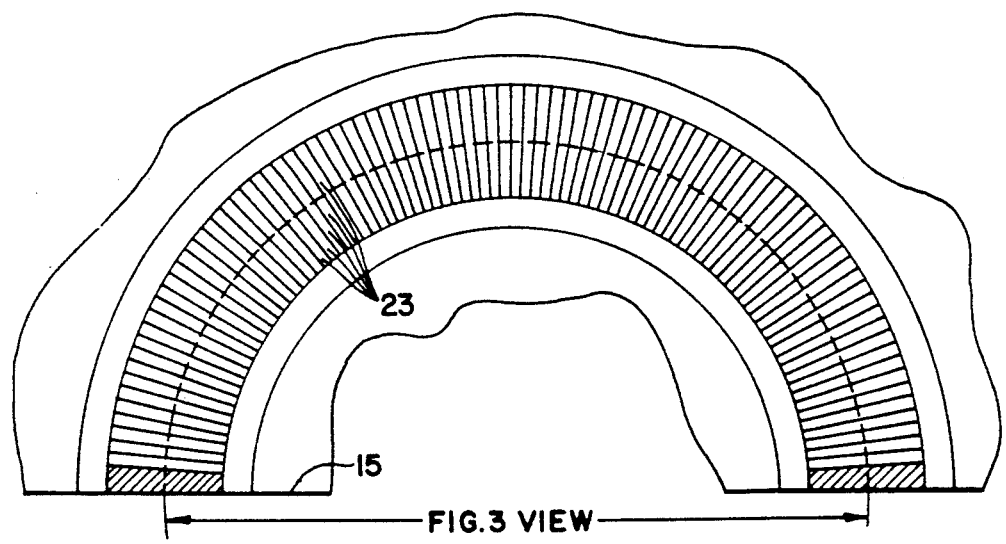
FIG. 2 is an elevational view of the nozzle portion of the turbine of FIG. 1.
Figure 3:
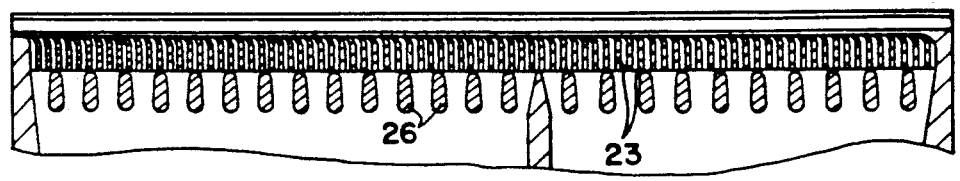
FIG. 3 is a cross sectional view taken as shown in FIG. 2.

The invention is best understood by reference to the accompanying drawings. FIGS. 1-3 show the prior art steam turbine of the nozzle type as is widely used throuhout industry. The turbine housing 28 conducts steam through passageways such as 25 into nozzle assemblies including nozzle portions or vanes 23 and sidewalls 21 and 22 and discharges it into a rotor shown by dotted lines 29. Partition 23 is shaped like a teardrop or an airfoil. Structural bridges 26 on the upstream side of partitions 23 are spread solid columns providing structural rigidity to the steam passageway as it narrows to flow past partitions 23. These partitions, as can be seen in FIG. 3 have a bent trailing edge to direct the steam to the left so as to give up its energy to blades on rotor 29 which may be angled to receive the full force of the steam energy. Rotor 29 is contacted by seals 24 to prevent steam losses that might pass around the edges of the rotor if the seals 24 were not there. Vanes 23 are usually assembled into a segment of a plurality of vanes 23 and the segments are welded into this nozzle area of the turbine and the welded areas must then be smoothed by machining, grinding, or both so as to minimize energy losses due to friction in the steam flow.

Present Invention

In order to retrofit such a turbine housing as that of FIGS. 1-3 to one having the features of this invention the nozzle portion 20 is cut away along any convenient surface 27 and replaced by nozzle portion 30 (FIGS. 4-6) which is welded along surface 27 to result in a rebuilt modified turbine housing. Retrofit portion 30 has a steam passageway to extend from 26 to and through the nozzle portions 34 to rotor 29 (shown in dotted lines). Nozzle portion 30 has a tapered groove 31 which extends behind all steam discharge parts, and may in the final turbine housing be a circular groove extending behind the 360° circular arrangement of nozzles discharging steam to rotor 29. In some designs the nozzles may not be arranged in a continuous circular length, but may be interrupted and divided according to valve arrangements for the turbine.

Groove 31 in cross section has an upstream wall 32 and two spaced opposing tapered walls 33 which are oriented to converge in the direction of steam flow. This wedge-shaped groove 31 is employed to permit a plurality of tapered nozzle sub-assemblies 34 to be slid along groove 31 to be positioned wherever desired. Each sub-assembly 34 has two sidewall members 35 supporting a vane member 36 between, the vane member 36 resting in a recess 43 in each sidewall member 35. These three components are temporarily bolted together until the subassemblies 34 are assembled into groove 31. Each vane member 36 has the shape of an airfoil or teardrop with a broadly rounded leading edge 40 facing the steam flow from passageway 25 and a thin, knife-edge trailing edge 39 facing rotor 29.

In order to assemble a plurality of sub-assemblies 34 into groove 31 keyways are cut in upstream wall 32 of groove 31 and in each subassembly 34 to be mated with one or more, preferably two keys 47. Keyways are also cut in the tapered sidewalls 33 of groove 31 and correspondingly in the tapered outer surface of sidewall members 35. Into these keyways, usually one per tapered surface, are placed key seals 46 which serve a double purpose, locking the sub-assembly 34 in groove 31 to prevent movement of sub-assembly 34 and sealing against any leakage of steam through the interface between groove 31 and subassembly 34. There also are seal keys 45 to prevent leakage of steam between each sidewall member 35 and vane member 36. After, assembling a plurality of subassemblies 34 in groove 31 there is an exposed portion at both ends of the assembly which is covered by a cover plate 42 by seal welding on both sides of the joint, as shown in FIG. 6.

In order to locate the retrofit nozzle portion 30 accurately with respect to main turbine housing 28 it is usually advisable to employ dowels 38. In order to make the assembly of sub-assemblies easy to accomplish the nozzle portion of the turbine, which may cover 360° of a circular arrangement, it is usually preferable to divide the turbine housing into two or more segments which can be joined to produce a 360° arrangement after arranging sub-assemblies 34 in groove 31. Bolt joining means 37 is employed to join two contiguous segments. A practical arrangement is to employ two 180° segments as shown in FIGS. 5 and 6 which are bolted together by bolt assembly 37.

Figure 4:
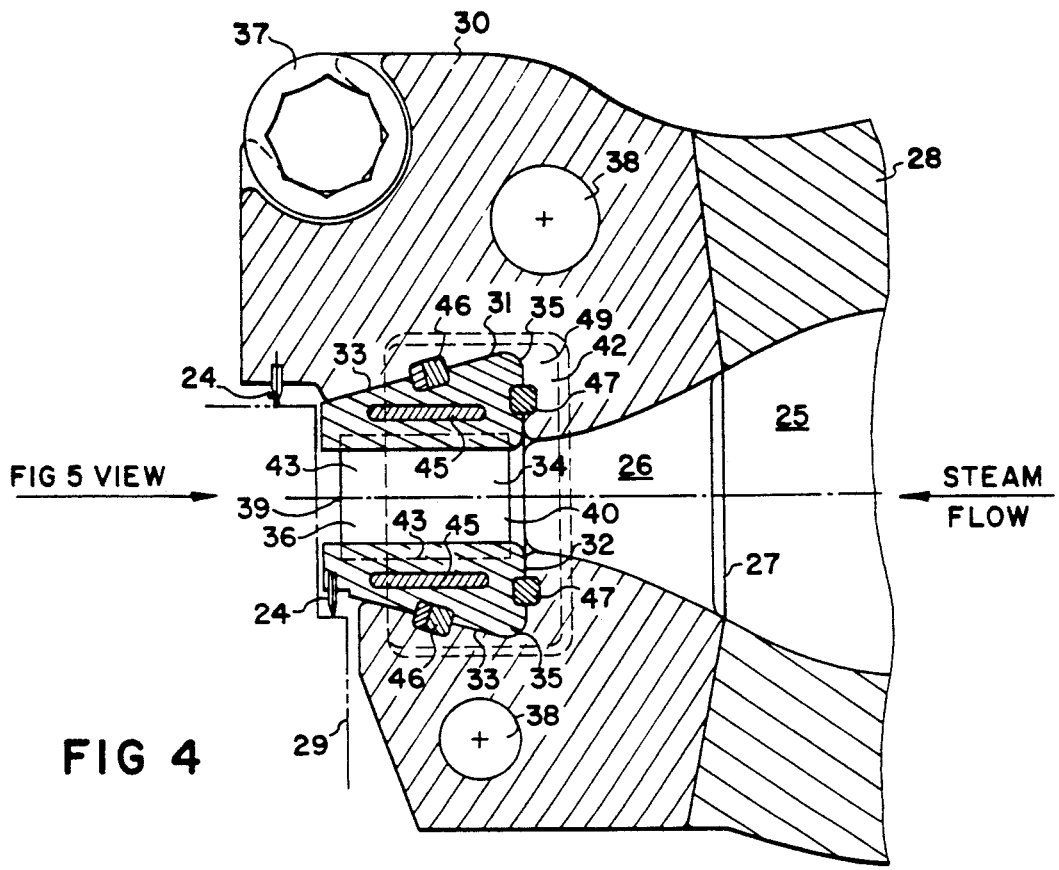
FIG. 4 is a cross-sectional view of the nozzle portion of a steam turbine of this invention.
Figure 5:
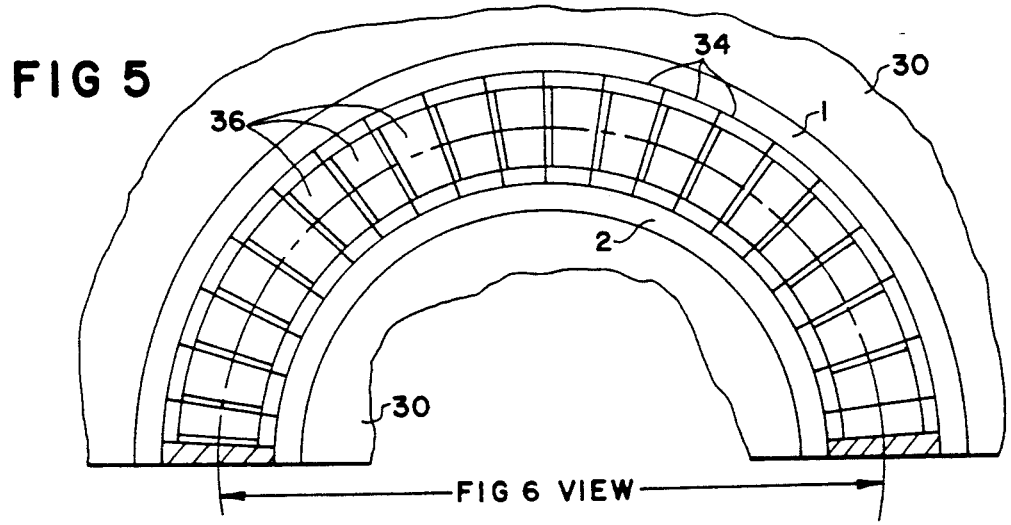
FIG. 5 is an elevational view of the nozzle portion shown in FIG. 4.
Figure 6:
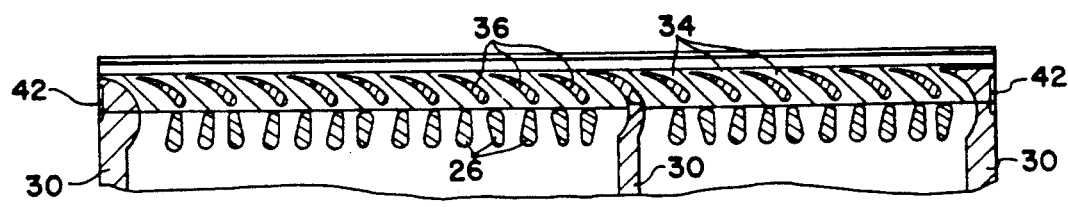
FIG. 6 is a cross sectional view taken as shown in FIG. 5.

The embodiment of FIGS. 4-6 is a mechanically designed assembly that is applicable for all types of 1st control stage nozzles and will replace the cast and weld fabrication designs, currently in use throughout the industry, which are exhibiting:

1. Extensive stationary blade repair costs.
2. Increasing replacement costs of diaphragms and rotating blades.
3. Reduced life expectancy of both stationary and rotating blades.
4. Unpredictable long term efficiency and turbine performance This invention provides a segmented, close tolerance, precision manufactured assembly. One of the major advantages of this construction is that individuals sidewalls 34 and nozzle partitions 36 can be replaced as required and material properties altered to meet the required operating conditions, as necessary. In addition, coatings or hard surfacing materials can be applied independently to each of these parts for increased service life and overall turbine performance.

There are drilled and tapped holes (not shown) in the sidewall members 35 and vane portions 36 to hold each sub-assembly 34 together while it is being positioned in groove 31 and while the assembly is being machined to match housing 28 to retrofit portion 30 with smooth accurage joints. When this finish machining is completed, matching the steam chamber angles, the bolts are removed. These taped holes can be used during the disassembly process if and when the nozzle partitions require replacement. At that time, after the segmented assembly is removed from the steam chamber, hydraulic fittings can be assembled to eacn taped hole and a hydraulic manifold line connected that will release the nozzle partition from the inner and outer sidewall pockets.

Stabilizing ring keys 47 are assembled, fixed and machined in the main steam chamber with a 0.003" to 0.005" clearance. During operation, these rings are made from austenitic steel, having a relatively high degree of thermal expansion, lightening the assembly and the wide restraining base will dampen possible vibration problems that might result from turbulence, water injection, and any other abnormal distrubance that might affect the life expectancy of the component parts.

Sidewall sealing and axial movement restriction rings 46 have a primary function of sealing off and eliminating any possible steam leakage on the mating surfaces of the main steam chamber wall. In addition, these rings further restrict the axial movement and anchor the inner and outer sidewalls of the steam path.

Segment seal keys 45 are required to prevent leakage at the interfaces of adjacent segments of sub-assemblies 34. These keys are implanted in sidewall members 35 and must be fitted at the time the segments are being assembled into the full nozzle portion.

Prior Art Diaphram

Figure 7:
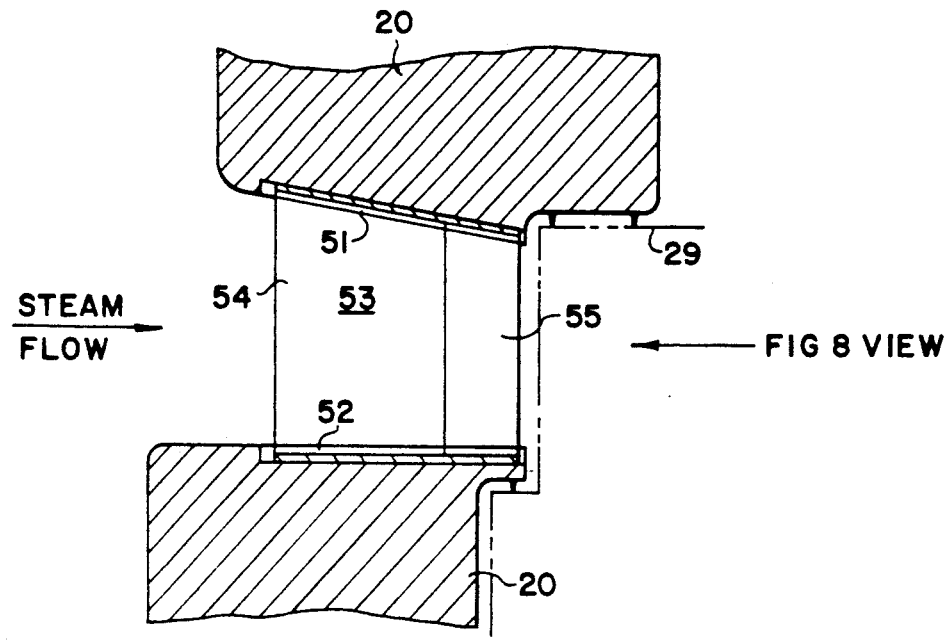
FIG. 7 is a cross sectional view of the nozzle portion in a prior art of the diaphragm type.
Figure 8:
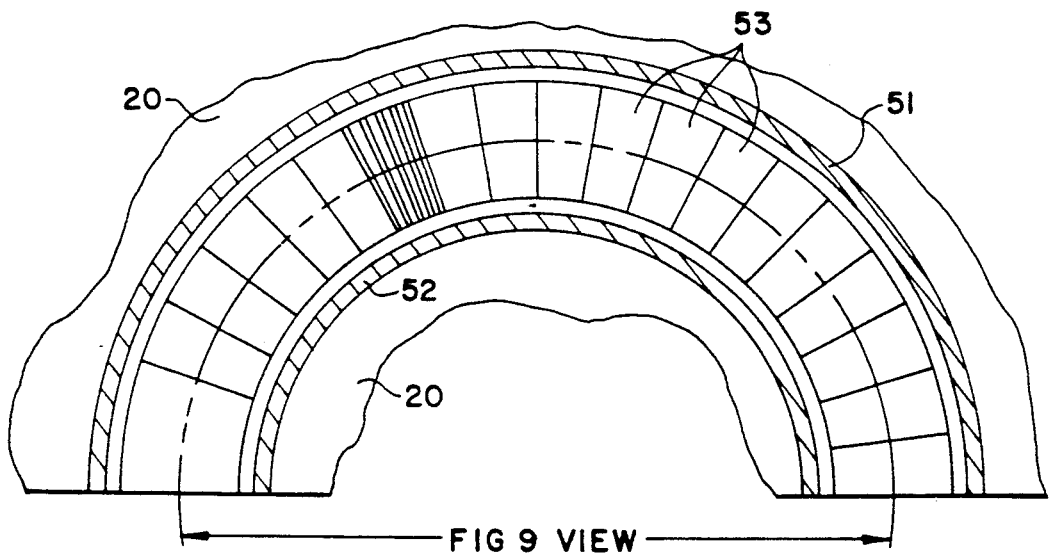
FIG. 8 is an elevational view of the nozzle portion of FIG. 7.
Figure 9:
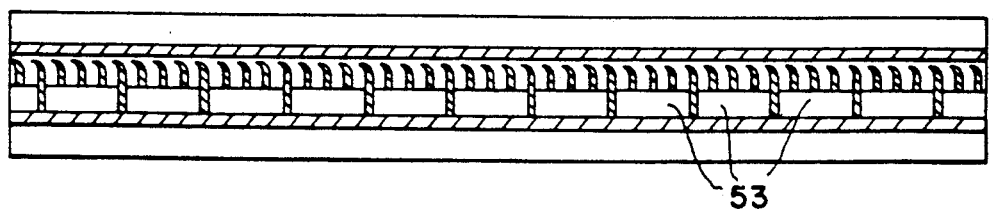
FIG. 9 is a cross sectional view taken as shown in FIG. 8.

The diaphragm system or the prior art is shown in FIGS. 7-9 wherein a plurality of vanes 53 are attached to outer band 51 and inner band 52 and welded to the housing structure 20 at the nozzle location leading to rotor 29. Vanes 53 are assembled in repeating units of spaced members as shown in FIGS. 8 and 9, In the prior art these vanes when damaged had to be replaced by cutting through the housing 20 and welding new vanes 53 individually or in segments of a plurality of vanes 53.

Present Invention

Figure 10:
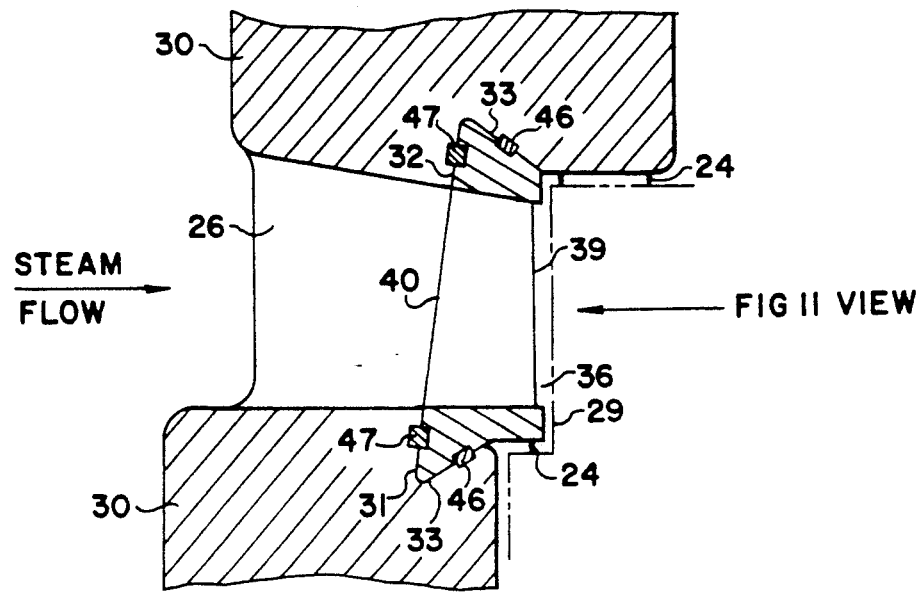
FIG. 10 is a cross sectional view of a nozzle portion of this invention of the diaphragm type.
Figure 11:
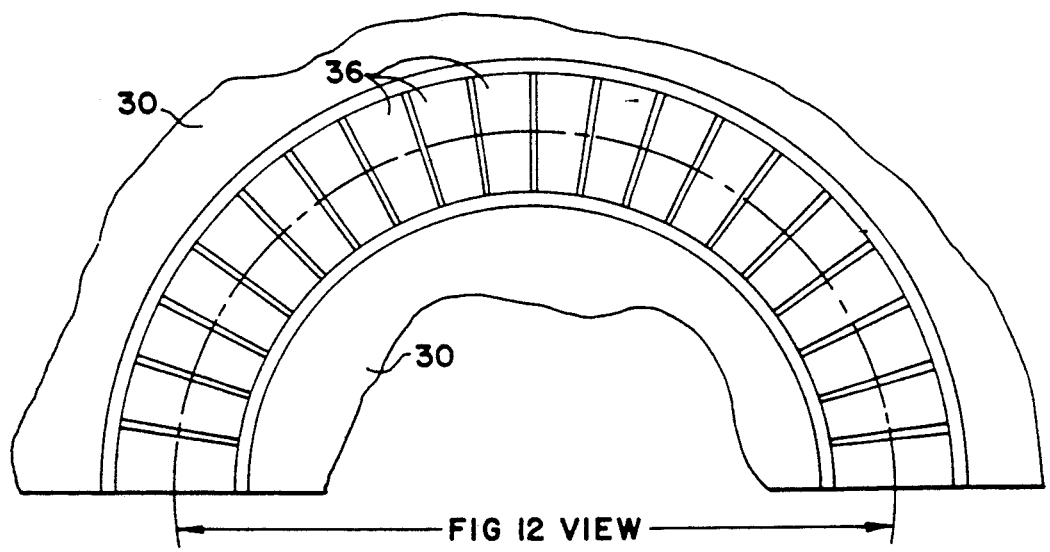
FIG. 11 is an elevational view of the nozzle portion of FIG. 10.
Figure 12:
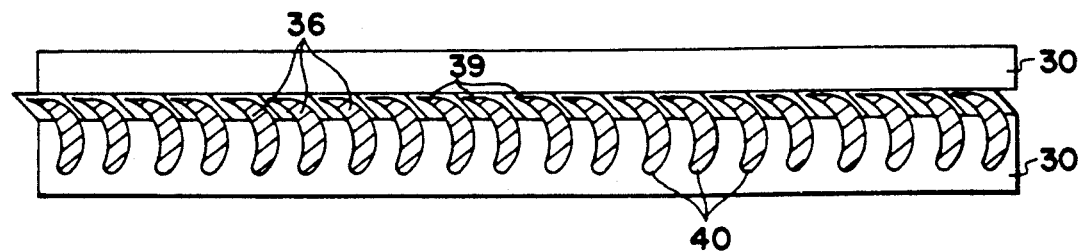
FIG. 12 is a cross sectional view taken as shown in FIG. 11.

In the present invention, as shown in FIGS. 10-12, the housing 20, after being cut apart to expose the nozzle area is machined to form a tapered groove 31 having an upstream wall 32 and two opposing tapered sidewalls 33 which converge toward each other in the direction of steam flow. Segments of a plurality of vanes 53 are assembled into groove 31 by using stabilizing ring keys 47 and ring seals 46 serving exactly the same purposes as described above with respect to the nozzle design. It has been found in many retrofit applications that whereas the original design had 180 vanes 53, the retrofit design could accomplish the same or better results with 34 vanes 53. This is illustrated by comparing FIGS. 8 and 9 of the prior art to FIGS. 11 and 12 of this invention.

Among the advantages of the present invention whether it be the nozzle design of FIGS. 4-6 or the diaphragm design of FIGS. 10-12, as compared to the prior art of FIGS. 1-3 and 7-9 respectively are:

1. The individual components in the turbine of this invention
   a. are removable
   b. are replaceable
   c. are repairable
   d. can be coated with a hard facing material or surface hardened over the area exposed to abrasive solid particle erosion due to exfoliation (carry-over - iron oxide) from the boiler.
   e. can be produced using various material and heat treatment specifications, depending on the type of operating service and environment to which the parts are subjected.
2. The integrity of and the material properties of each component are designed and would be dependent upon the operating environment; in particular, the stage temperatures, pressures, and degree of solid particle erosion. Under no circumstances would any of the components require welding, stress relieving or any special heat treatment after manufacture and assembly that might possibly alter or affect the functional and intended design properties of any of these component parts.
3. The maintainability of the components will require a minimum amount of training and specialized skills to replace these components.
4. The adaptability of the design is applicable to all new and existing steam turbine types, independent of the manufacturing source.
5. The performance of the design is expected to increase the individual stage efficiency by approximately 2% to 3%. This is based on the reduced pressure drop across the stationary nozzle or diaphragm, the increased available energy to the mating row of rotating blades and the improved steam path flow conditions.
6. The life expectancy of this construction is greatly enhanced by the reduced turbulent flow and carry-over (iron oxides) velocity from the boiler. A three to five year longer period of High Stage Performance (HSP) can be realized, based on the proper control and selection of materials and unit operating practices. Presently, the evidence suggests that performance and unit efficiency is dramatically reduced after one to one and half years of service after a major restoration or overhaul. These values may vary and are dependent upon the type of service to which the unit is subjected and the rate of boiler deterioration or degradation.

The process of preparing a retrofit turbine under this invention involves the steps of:

(1) cutting away from the remainder of the turbine housing the nozzle portion;

(2) preparing a replacement nozzle portion to be subsequently welded to the turbine housing;

(3) machining an annular groove in the replacement nozzle portion immediately upstream from the steam discharge part into the rotor; the groove having an upstream wall generally perpendicular to the direction of steam flow, and two spaced opposing tapered walls that converge in the direction of steam flow;

(4) preparing a sub-assembly of vane portions having a wedge shape to fit in the groove;

(5) cutting keyways in the groove and adjoining wall of the vane portions to accept keys in each upstream wall and tapered wall of the groove and adjoining parts of the vane portions;

(6) assembling a plurality of vane portions into the groove employing keys in each keyway;

(7) inserting seals between adjoining segments or nozzle portions;

(8) attaching cover plates to cover exposed portions of the segments by seal welding the cover plates to the turbine housing;

(9) assembling nozzle portions with the assistance of dowels to produce a circular nozzle assembly; and

(10) bolting adjoining nozzle portions together to the turbine housing.

Between steps 9 and 10 there may be some machining to smooth areas of juncture in the steam flow path and other locations.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what it is desired to secure by Letters Patent of the United States is:

1. A steam turbine having a stationary annular passageway for conducting steam to a rotor driven by that steam, said passageway terminating in an arcuate groove having an upstream wall generally perpendicular to the direction of steam flow and a first pair of spaced tapered opposing wall portions that converge in the direction of steam flow, a plurality of tapered vane portions spacedly arranged in said groove, said vane portions having an upstream end portion and a second pair of spaced tapered opposing wall portions to fit snugly into said groove and to direct the flow of steam in a predetermined direction toward said rotor, releasable means located between said upstream wall of said groove and each said upstream end portion of said vane portion and between each of said opposing wall portions of said first and second pair for positioning each said vane portion in said groove and for sealing it against steam leakage in any direction other than through said passageway and towards said rotor.

2. The turbine of claim 1 wherein said releasable means includes an austenitic stabilizing ring key engaging a keyway along said upstream wall of said groove and said upstream wall portion of said vane portion to provide a tight fit between said groove and each said vane portion to dampen vibrations.

3. The turbine of claim 1 wherein said releasable means includes a ring key engaging a keyway in said tapered wall of said groove and said tapered opposing wall portions of said vane portions to seal against steam leakage.

4. The turbine of claim 1 wherein said groove and said passageway are divided into two mating 180° portions.

5. The turbine of claim 1 wherein said vane portion is a sub-assembly of a short length of an arcuate airfoil member sandwiched between two spaced sidewall members having tapered outer contours defining said two tapered wall portions that fit into said groove.

6. The turbine of claim 5 wherein said releasable means includes a ring seal between said airfoil member and its adjacent said sidewall member to prevent steam leakage therebetween.

7. The turbine of claim 2 wherein said releasable means includes a ring key engaging another keyway in each said tapered wall of said groove and each said tapered opposing wall portions of said vane portions to seal against steam leakage.

8. The turbine of claim 2 wherein each said vane portion is a sub-assembly of a short length of an arcuate airfoil member sandwiched between two spaced sidewall members having tapered outer contours defining said two tapered wall portions that fit into said groove.

9. The turbine of claim 8 wherein said releasable means includes a locking ring key between said upstream wall of said groove member and its adjacent said sidewall member to prevent steam leakage therebetween.

10. The turbine of claim 9 wherein said groove and said passageway are divided into a plurality of mating sections, and means for rigidly attaching said sections together.

11. A steam turbine comprising a rotor and a stationary housing having an annular passageway for conducting steam to said rotor driven by that steam, said passageway terminating in an enlarged arcuate groove having an upstream wall generally perpendicular to the direction of steam flow and a first pair of spaced tapered opposing wall portions spaced outwardly of said passageway and which converge in the direction of steam flow, a plurality of tapered vane portions spacedly arranged in said groove, said vane portions having an upstream end portion and a second pair of spaced tapered opposing wall portions to fit snugly into said groove and to direct the flow of steam in a predetermined direction toward said rotor, releasable means located between said upstream wall of said groove and each of said upstream end portions of said vane portions and said wall portions of said first and second pair for positioning each said vane portion in said groove and for sealing it against steam leakage in any direction other than through said passageway and towards said rotor.

12. The turbine of claim 11 wherein said releasable means includes a ring key engaging a keyway in each said tapered wall of said groove and each said tapered opposing wall portions of said vane portions to seal against steam leakage.

13. The turbine of claim 11 wherein said releasable means includes an austenitic stabilizing ring key engaging a keyway along said upstream wall of said groove and said wall portion of said vane portion to provide a tight fit between said groove and each said vane portion to dampen vibrations.

14. The turbine of claim 11 wherein each said vane portion is a sub-assembly of a short length of an arcuate airfoil member sandwiched between two spaced sidewall members having tapered outer contours defining said two tapered wall portions that fit into said groove, said releasable means includes a ring seal between said airfoil member and its adjacent said sidewall member to prevent steam leakage therebetween.

15. The turbine of claim 12 wherein said releasable means includes an austenitic stabilizing ring key engaging another keyway along said upstream wall of said groove and said wall portion of said vane portion to provide a tight fit between said groove and each said vane portion to dampen vibrations.

16. A process for preparing a retrofit of a steam turbine having a housing with a stationary part, and nozzles forward of an upstream chamber, wherein the retrofit has replaceable nozzle portions, which comprise:
  (1) cutting away from the stationary part of the turbine housing all the nozzles and a portion of the turbine upstream chamber;
  (2) welding to the stationary part a replacement for the cut-away section having an annular tapered groove formed by an upstream wall and a pair of tapered side walls as a seat for receiving tapered steam path nozzle portions;
  (3) preparing a pair of spaced circular keyways in the upstream wall of the groove and placing circular austenitic stabilizing keys respectively therein;

(4) preparing the tapered side walls to form a circular keyway on each tapered side wall;

(5) sliding into the turbine housing between the tapered side walls a plurality of nozzle portions shaped to fit the taper of the groove, each portion having a keyway to fit one of the circular keys and two other keyways mating with respective circular keyways on the tapered side walls;

(6) inserting seal rings in the mating keyways to prevent steam leakage between that groove and the nozzle portions along the tapered portions; and (7) placing a cover plate over exposed parts of the nozzle portions.

17. The process of claim 16 wherein the replacement for the cutaway section comprises two semicircular halves, further comprising bolting together to form a full circular member.

18. The process of claim 17 further comprising providing spaced dowels between the semicircular halves prior to bolting the halves together.

19. The process of claim 18 further comprising machining to smooth areas of juncture in the assembled retrofit prior to bolting the halves together.

20. The process of claim 16 further comprising inserting seals between adjoining nozzle portions prior to step 7.

* * * * *